United States Patent
Shichijyo et al.

(10) Patent No.: US 6,275,404 B1
(45) Date of Patent: Aug. 14, 2001

(54) RECTIFIER ARRANGEMENT OF VEHICLE AC GENERATOR

(75) Inventors: Akiya Shichijyo, Ama-gun; Hiroaki Ishikawa, Nagoya; Atsushi Umeda, Okazaki; Masaaki Iwata, Aichi-gun; Takafumi Tsuge, Ena; Shigenobu Nakamura, Anjo, all of (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 09/482,560

(22) Filed: Jan. 14, 2000

(30) Foreign Application Priority Data

Mar. 30, 1999 (JP) .................................................. 11-088400
Jul. 14, 1999 (JP) .................................................. 11-200699

(51) Int. Cl.⁷ .............................. H02M 1/00; H02K 9/28
(52) U.S. Cl. ...................... 363/145; 363/141; 310/68 D; 310/71
(58) Field of Search ....................... 363/141, 144, 363/145; 290/31, 32; 310/68 D, 71, 67 R, 68 R, 58, 59, 60 A

(56) References Cited

U.S. PATENT DOCUMENTS 3,582,762 * 6/1971 Mori et al. ............................ 257/706
5,883,450   3/1999 Abadia et al. .
5,977,669 * 11/1999 Yoshida et al. ..................... 310/68 D
6,160,335 * 12/2000 Ishida et al. ........................ 310/68 D
6,198,188 *  3/2001 Ihata ................................... 310/68 D

FOREIGN PATENT DOCUMENTS 9-135558   5/1997 (JP) .

* cited by examiner

*Primary Examiner*—Adolf Deneke Berhane
(74) *Attorney, Agent, or Firm*—Pillsbury Winthrop LLP

(57) ABSTRACT

An AC generator for a vehicle includes a rotor, a stator having a three-phase stator winding, a three-phase full-wave rectifier unit, an insulation cover, and a frame for rotatably supporting the rotor. The rectifier unit includes a cooling fin structure having at least three positive diodes and three negative diodes fixed thereto and a terminal member having a wiring member connecting the positive and negative diodes to form the three-phase full-wave rectifier unit and three first partition members. The wiring member has first connecting portions connected to the positive and negative diodes and second connecting portions connected to three output leads of the stator winding. Each of the first partition members extend toward the insulation cover between one of the first connecting portions and the cooling fin structure.

18 Claims, 12 Drawing Sheets

RECTIFIER ARRANGEMENT OF VEHICLE AC GENERATOR

CROSS REFERENCE TO RELATED APPLICATION

The present application is based on and claims priority from Japanese Patent Applications Hei 11-88400 filed Mar. 30, 1999, and Hei 11-200699 filed Jul. 14, 1999, the contents of which are incorporated herein by reference.

BACKGROUND OF THE INVENTION

1. Field of the Invention

The present invention relates to an AC generator for a vehicle and, particularly, a rectifier unit arrangement of an AC generator.

2. Description of the Related Art

In an ordinary vehicle AC generator, a rectifier unit is mounted therein to rectify AC voltage induced in a stator winding when a rotor rotates. For example, if the stator winding is a three-phase winding, a pair of diodes is necessary for every phase. That is, six diodes, or eight diodes if neutral-point power is taken out, are necessary in total for a three-phase full-wave rectifier unit. U.S. Pat. No. 5,883,450 and JP-A-9-135558, which corresponds to U.S. patent application Ser. No. 08/745,775, disclose a rectifier unit which includes a positive cooling fin having positive diodes fixed thereto, a negative cooling fin having negative diodes fixed thereto, and a terminal member. The terminal member connects one end of the positive diodes and one end of the negative diodes together and also connects leads of the stator winding to portions around the outer periphery of the positive cooling fin or portions formed at the outer periphery of the negative cooling fin.

In the above rectifier unit, the terminal member is disposed at portions around the outer periphery of the positive cooling fin or portions formed at the outer periphery of the negative cooling fin. If water or a foreign particle such as an electrolyte gets into the inside of the AC generator, it may flow along the positive cooling fin into spaces formed between the terminal member and the outer periphery of the positive cooling fin, causing insulation failure.

SUMMARY OF THE INVENTION

A main object of the invention is to provide an improved rectifier unit that is free of insulation failure.

According to a main feature of the invention, in an AC generator for a vehicle which includes a rotor, a stator having a multi-phase stator winding, a multi-phase rectifier unit, a rectifier cover, and a frame, the rectifier unit includes a cooling fin structure, a plurality of diodes fixed to the cooling fin structure, and a terminal member having a wiring member connecting a plurality of output leads of the stator winding and the diodes at respective connecting portions. The terminal member has a plurality of partition members each of which extends axially between one of the connecting portions and the cooling fin structure. As a result, each of the partition members surrounds one of the diodes to prevent water or electrolytes flowing along the surface of the cooling fin structure from reaching the connecting portion.

In the AC generator as formed above, each of the partition members preferably extends toward the rectifier cover beyond the cooling fin structure. Each of the partition members may also extend beyond the connecting portions. The rectifier cover preferably has a plurality of air intake windows disposed radially inner side of the partition members, and the connecting portions are disposed radially outer side of the partition members.

According to another aspect of the invention, in an AC generator for a vehicle which includes a rotor, a stator having a stator winding and a plurality of output leads, a rectifier unit, a insulation cover, and a frame, the insulation cover has a plurality of drain holes and is disposed outside the frame to cover the rectifier unit. The rectifier unit includes a cooling fin structure, a plurality of diodes fixed to the cooling fin structure, and a terminal member having a wiring member connected to the plurality of output leads at first connecting portions and connected to the plurality of diodes at second connecting portions. The terminal member has a plurality of first partition members each of which extends in parallel with the axis of the rotor between one of the first connecting portions and the cooling fin, and each of the first partition members is disposed at the drain holes. Therefore, water or electrolytes can be drained through the drain holes effectively. In the above AC generator, each of the first partition members has a concave surface facing radially inward.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

First Embodiment

Figure 1:
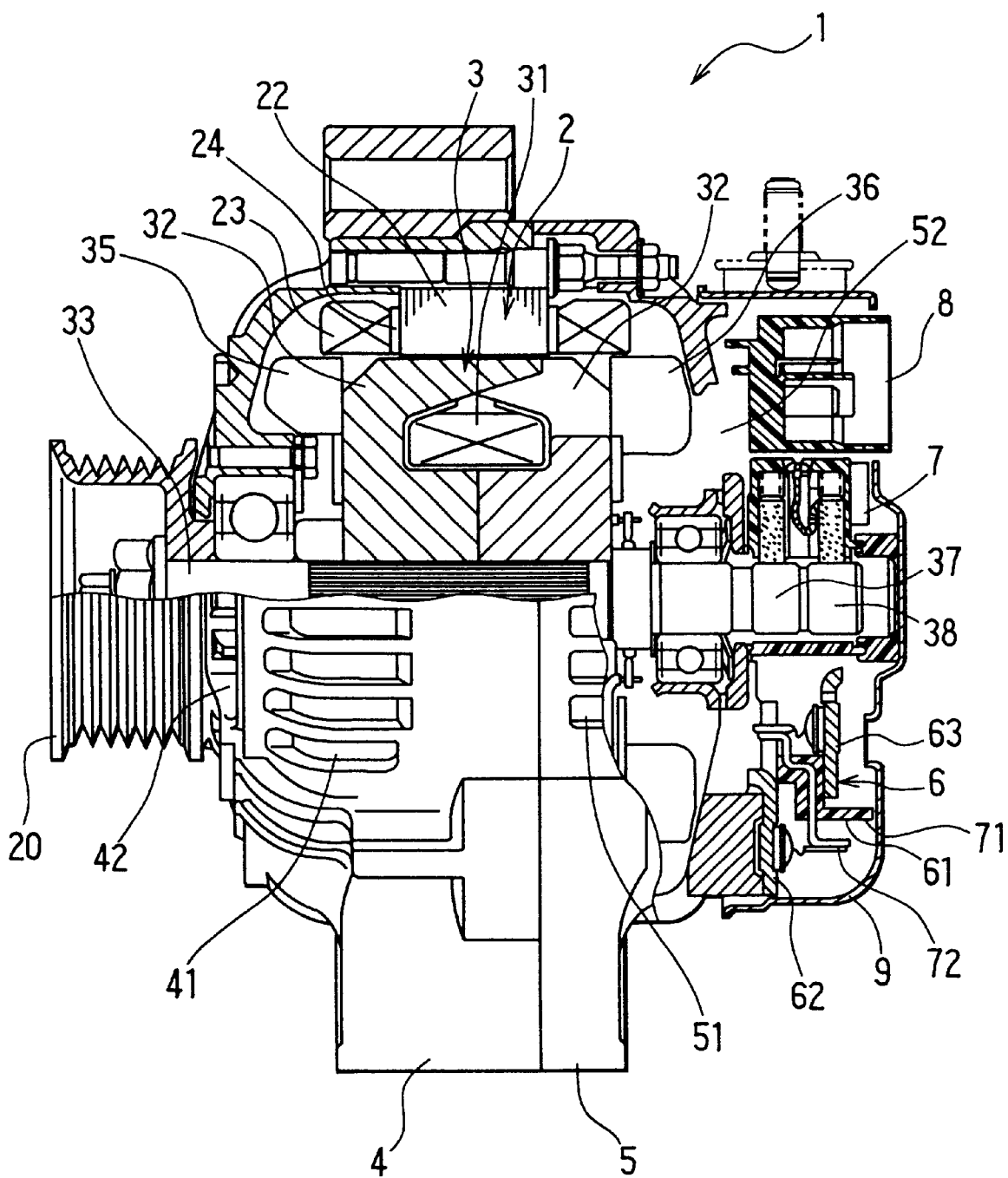
FIG. 1 is a cross-sectional side view of a vehicle AC generator according to a first embodiment of the invention.

As shown in FIG. 1, a vehicle AC generator according to a first embodiment of the invention includes stator 2, rotor 3, frames 4, 5, rectifier unit 6, brush unit 7, rectifier unit 8 and rear (i.e. right) cover 9. Stator 2 has stator core 22, three-phase stator winding 23 and insulators 24 insulating stator winding 23 from stator core 22.

Rotor 3 has cylindrically-wound-and-insulation-treated field coil 31, a pair of front (left) and rear (right) pole cores 32 each of which has six claw poles extending axially from opposite ends to enclose field coil 31. Cooling fan 35 is welded to the front surface of front pole core 32 which takes in air at the front portion thereof and discharges the same in both the axial and radial directions. In the same manner, cooling fan 36 is welded to the rear surface of rear pole core 32 which takes in air at the rear portion thereof and discharges the same radially outward. A pair of slip rings 37 and 38 is disposed at the rear end of shaft 33. Electric current is supplied through the pair of slip rings 37 and 38 to field coil 31 from brush unit 7.

Frames 4, 5 accommodate stator 2 and rotor 3 therein so that rotor 3 can rotate with shaft 33 and stator 2 can be disposed around pole cores 32 at a distance. These frames 4, 5 respectively have air discharge windows 41, 51 at portions opposite the coil ends of stator winding 23 that projects axially from stator core 22 and air intake windows at the axial ends of frames 4, 5.

Rectifier unit 6 rectifies three-phase alternating current generated by three-phase stator winding 23 to direct current. Protecting rear cover 9 is disposed to cover rectifier 6 which is fixed to an outside portion of frame 5, brush unit 7, and voltage regulator 8, thereby keeping off foreign particles.

Vehicle AC generator 1 rotates in a prescribed direction if engine torque is transmitted through a belt (not shown) and pulley 20. If field coil 31 is energized, each claw poles of pole core 32 is excited, so that three-phase AC voltage can be generated, and DC power is provided at output terminals of rectifier unit 6.

Figure 2:
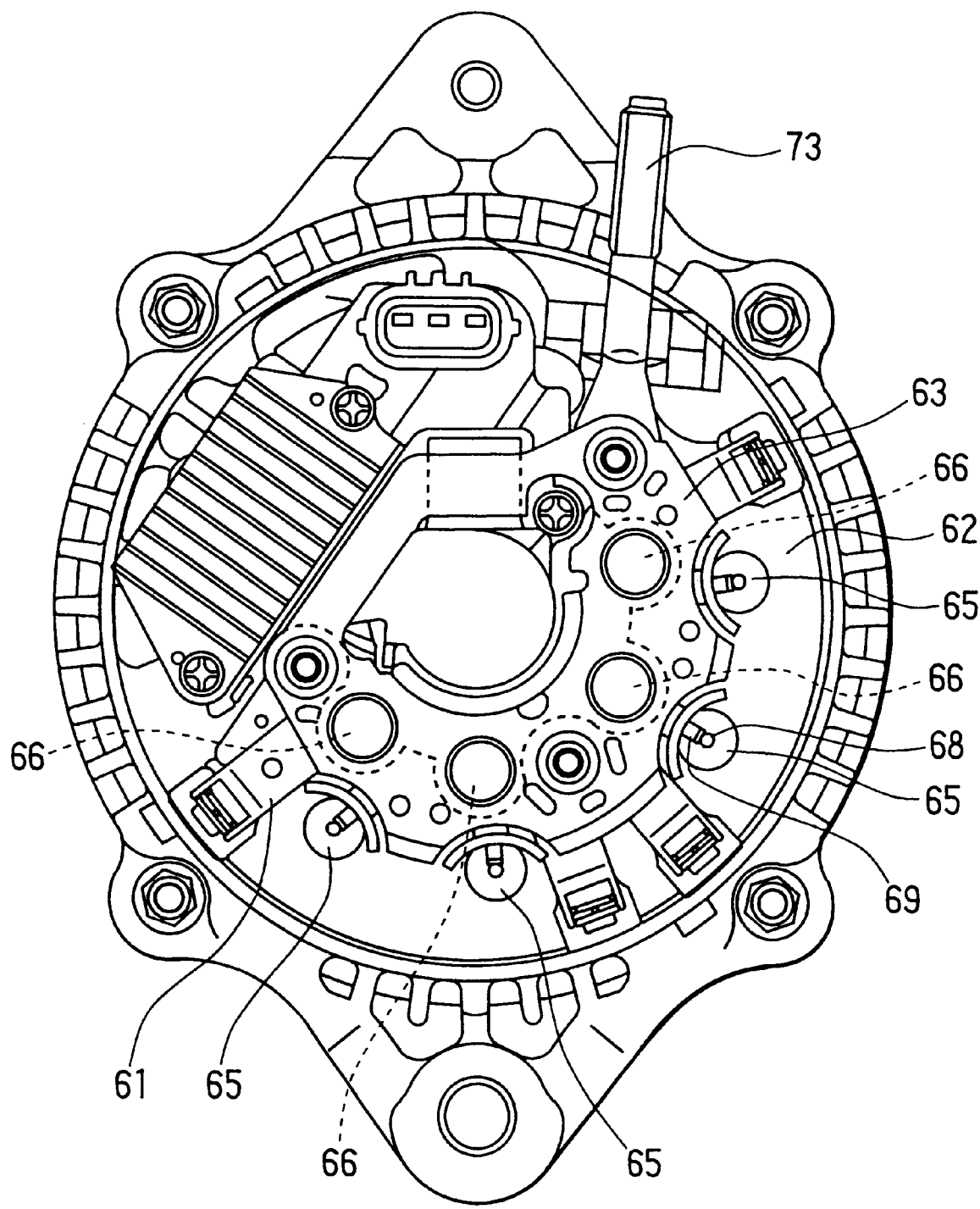
FIG. 2 is a rear view of the AC generator shown in FIG. 1.

As shown in FIGS. 1 and 2, rectifier unit 6 includes negative cooling fin 62, positive cooling fin 63, terminal member 61, four negative diodes 62 fixed to negative cooling fin 62, four positive diodes 66 fixed to positive cooling fin 63. Negative cooling fin 62 and positive cooling fin 63 are disposed parallelly in the axial direction at a distance from each other.

Negative cooling fin 62 is an arc-shaped member that has an outside diameter nearly equal to the inside diameter of rear cover 9. Four negative diodes 65 are aligned in an arc at suitable intervals and welded or soldered to negative cooling fin 62 at one end thereof. Each of four negative diodes 65 has a lead wire at the other end thereof, which is welded to one of wiring terminals 69 extending from terminal member 61. Wiring terminals 69 are molded with a resinous insulation material to form terminal member 61.

Positive cooling fin 63 is an arc-shaped member that has an outside diameter smaller than the outside diameter of negative cooling fin 62. Four positive diodes 66 are aligned in an arc at suitable intervals and welded or soldered to positive cooling fin 63 at one end thereof. Each of four positive diodes 66 has a lead wire at the other end thereof, which is welded to one of wiring terminals 69 extending from terminal member 61.

Figure 4:
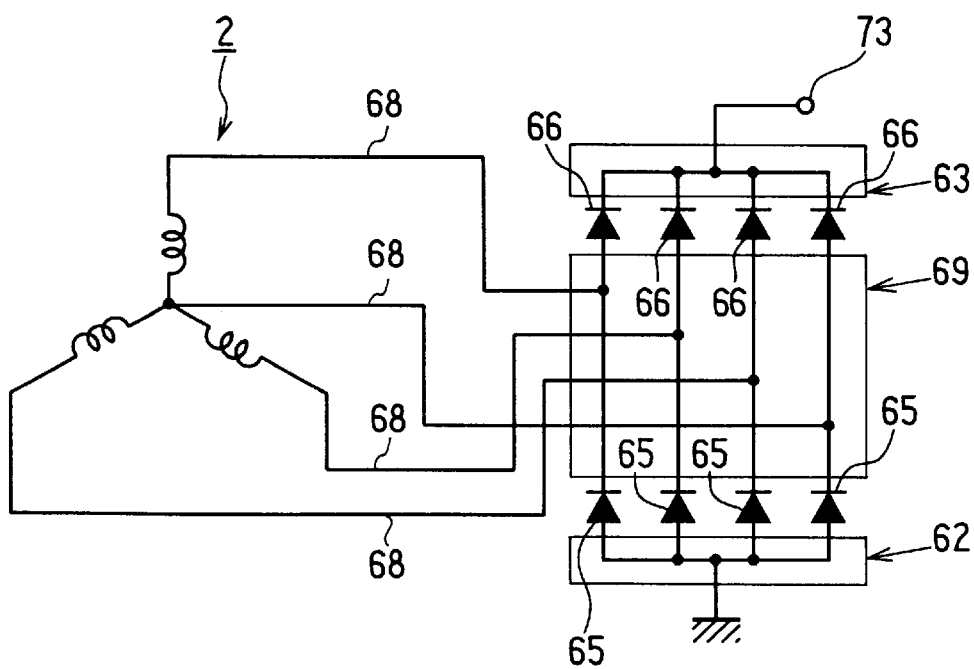
FIG. 4 is an electric circuit diagram of the AC generator according to the first embodiment.

Each of negative diodes 65 is paired with the closest one of positive diodes 66, thereby forming four pairs of series connected negative and positive diodes 65 and 66. Negative diode 65 of each of the pairs and positive diode 66 thereof are respectively welded to a pair of outside and inside wiring terminals 69 of terminal member 61. Wiring terminals 69 are respectively connected to four leads 68 (three output leads and a neutral lead) of stator winding 23 by bolts or the like as shown in FIG. 4. DC output terminal 73 extends from positive cooling fin 63.

Figure 3:
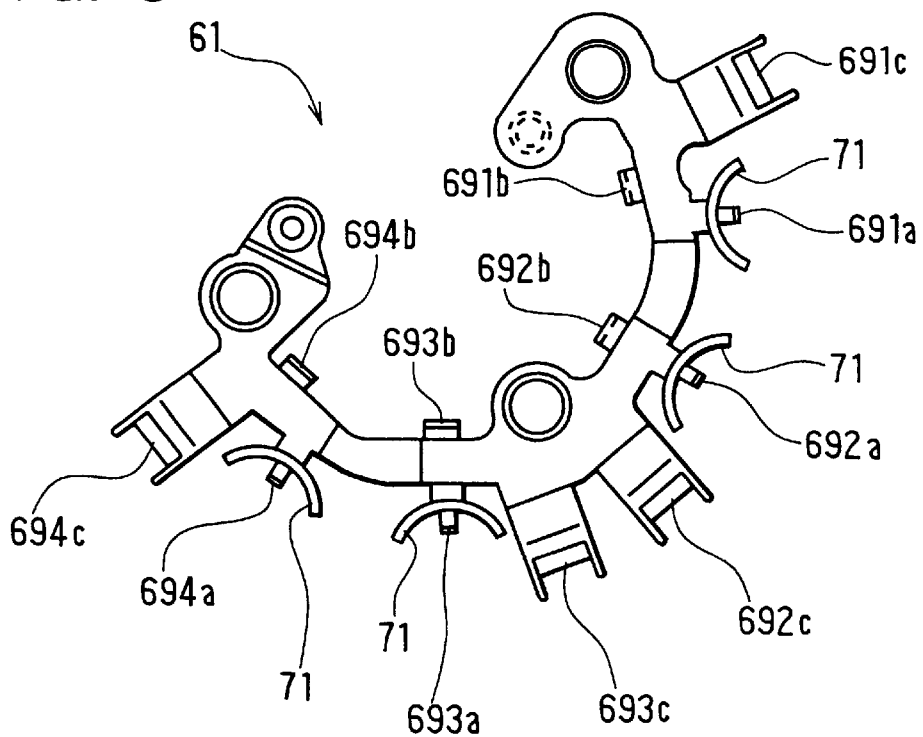
FIG. 3 is a schematic view of a terminal member of a rectifier.

Wiring terminals 69 are located as shown in FIG. 3, in which each wiring terminal is renumbered 691a, 691b, 691c–694a, 694b, 694c.

Figure 5:
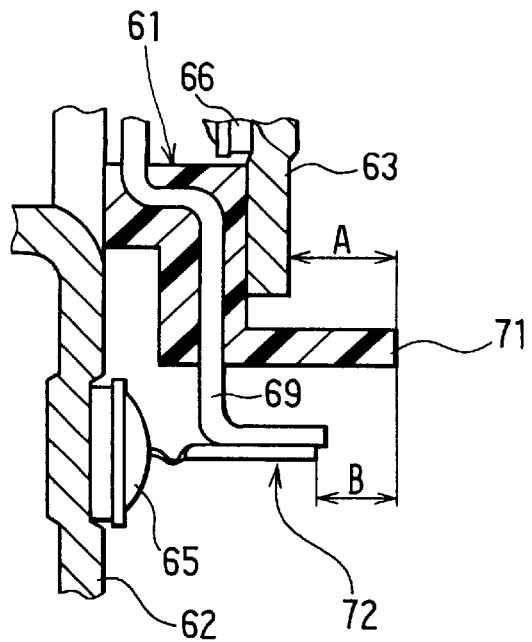
FIG. 5 is a schematic cross-sectional diagram illustrating a partition member.

Outside wiring terminal 691a is connected to negative diode 65 of the first pair at connecting portion 72 as shown in FIG. 5, inside wiring terminal 691b is connected to positive diode 66 of the same pair, and wiring terminals 691a, 691b and input wiring terminal 691c are connected to one another in terminal member 61. Outside wiring terminal 692a is connected to negative diode 65 of the second pair at connecting portion 72, inside wiring terminal 692b is connected to positive diode 66 of the same pair, and wiring terminals 692a, 692b and 692c are connected to one another in terminal member 61. Other wiring terminals are also connected in the same manner as above.

As shown in FIG. 5, semi-cylindrical partition members 71 are respectively formed in terminal member 61 to extend left or in the axial direction of rotor 3, so that any one of wiring terminals 691a–694a is sufficiently spaces apart from the outer periphery of positive cooling fin 63. Four leads 68 extending from stator winding 23 are respectively connected to input wiring terminals 691c–694c by screws. Each of partition members 71 extends in the axial direction of rotor 3 between one of connecting portions 72 and the outer periphery of positive cooling fin 63. Partition members 71 are formed when terminal member 61 is insert-molded. It is also possible that partition members 71 are formed separately and fixed to terminal member 61 thereafter.

Partition members 71 extend beyond the rear surface of positive cooling fin 63 (i.e. A>0 in FIG. 5). Thus, partition members 71 guide water or electrolytes flowing in along the outside surface of positive cooling fin 63 to the outside thereof, thereby preventing the same from entering connecting portions 72. Semi-cylindrical partition member 71 can be replaced with U-shaped or other concave member. Partition members 71 extend to or beyond connecting portions 72 (i.e. B≧0), but not beyond the inner surface of rear cover 9.

Figure 6:
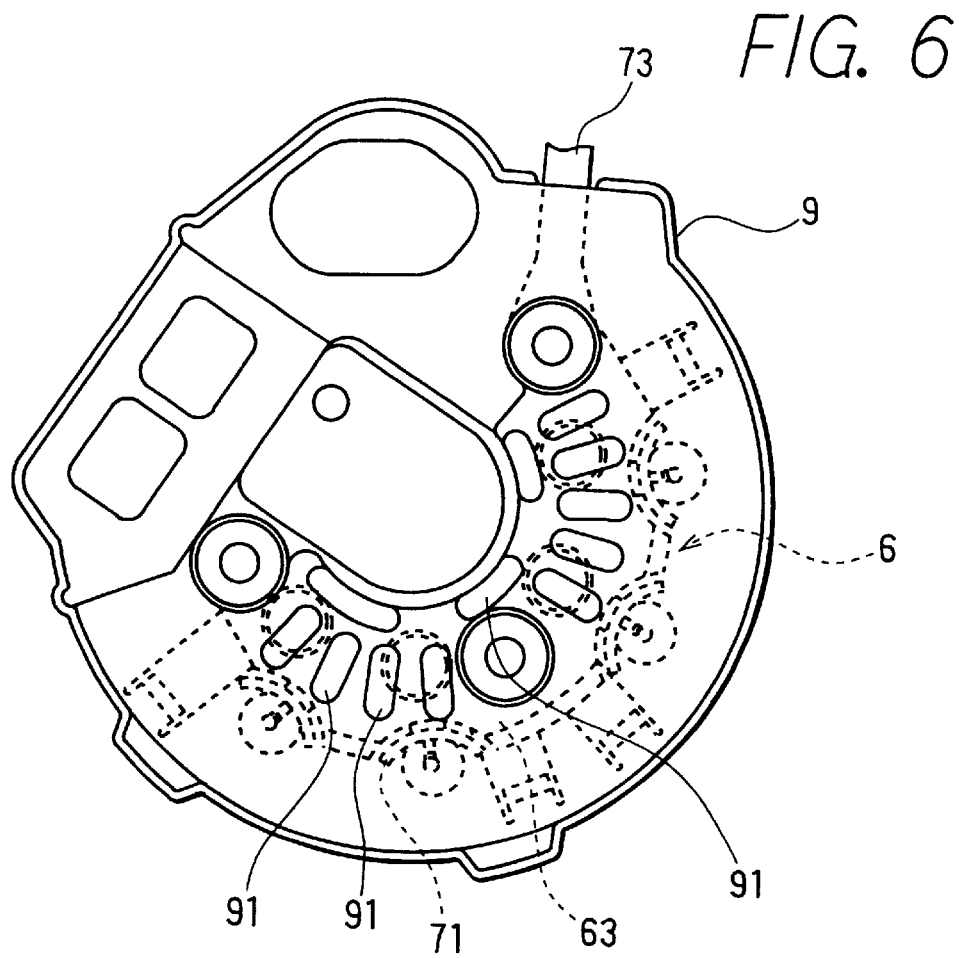
FIG. 6 is a plan view of a rear cover according to the first embodiment.

As shown in FIG. 6, rear cover 9 has a plurality of air intake windows 91 at portions corresponding to negative cooling fin 62. That is, partition members 71 are disposed between the plurality of air intake windows 91 and connecting portions 72. Water and foreign particles included in the cooling air flow along positive cooling fin 63 radially outward to negative cooling fin 62. However, they are interrupted by partition member 71 before reaching connecting portions 71.

Figure 7:
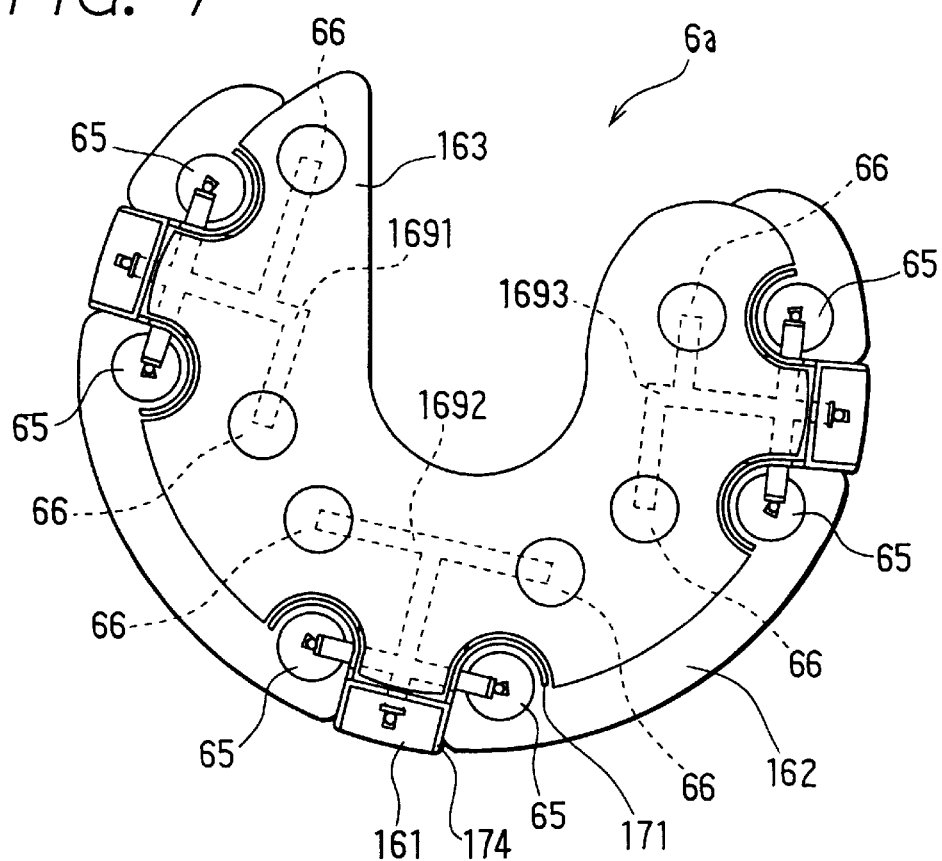
FIG. 7 is a plan view of a variation of the rectifier unit.
Figure 8:
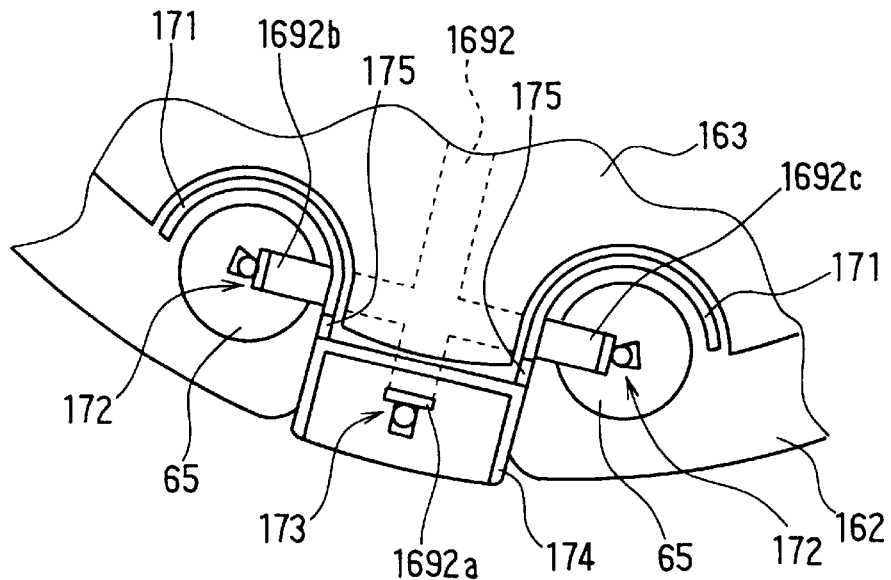
FIG. 8 is an enlarged fragmentary view of a portion of the rectifier unit shown in FIG. 7.

A variation 6a of rectifier unit 6 is shown in FIGS. 7 and 8. Rectifier unit 6a includes negative cooling fin 162 with six negative diodes 65 soldered thereto, positive cooling fin 163 with six positive diodes soldered thereto, and terminal member 161 connecting three groups of two pairs of positive diodes 65 and negative diodes 66.

Six negative diodes 65 are soldered to negative cooling fin 162 along an arc line so that two negative diodes 65 of each group are close to each other and connected to respective wiring terminals 169. Six positive diodes 66 are also soldered to positive cooling fin 163 along a radially inner arc line so that two positive diodes 66 of each group are close to each other and connected to respective wiring terminals 169. wiring terminals 169 are also connected to three leads 68 extending from stator winding 23. For example, three wiring terminals 1691, 1692, and 1693 are formed to correspond to the three groups of two pairs of positive and negative diodes. As shown in FIG. 8, wiring terminal 1692$a$ is connected to one of leads 68, and wiring terminals 1692$b$ and 1692$c$ are respectively connected to negative diodes 65.

Figure 9:
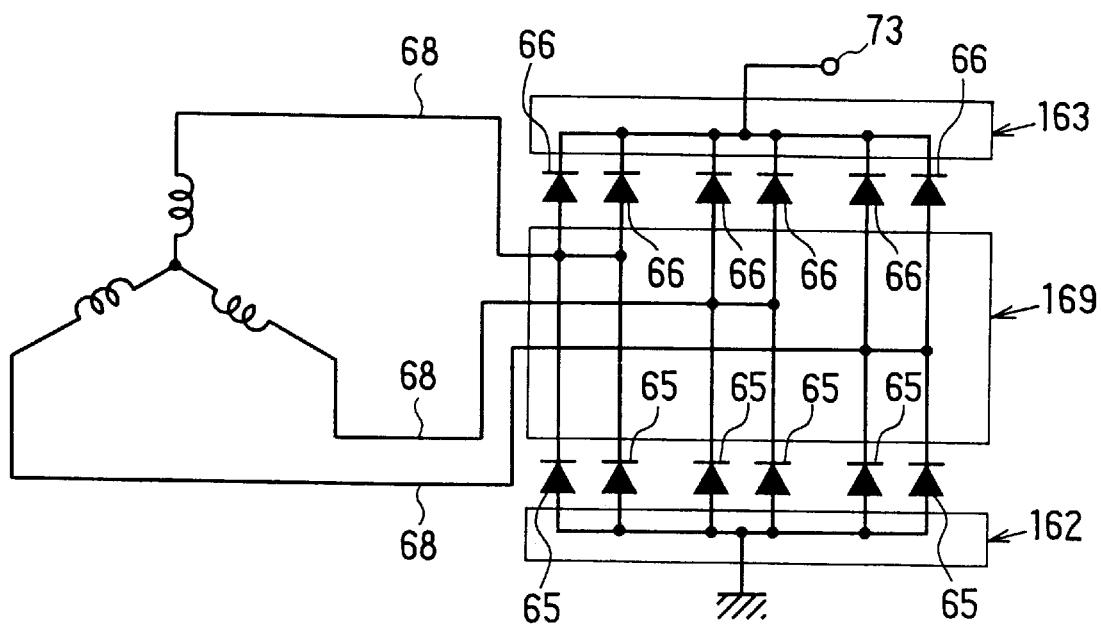
FIG. 9 is an electric circuit diagram of the AC generator having the variation of the rectifier unit therein.

As shown in FIG. 9, two pairs of series-connected negative and positive diodes 65, 66 of each group are jointly connected at the middle thereof to correspond to one of three phase windings of stator winding 23. Six negative diodes 65 are connected, at the outer ends, to negative cooling fin 162, which is grounded through frame 5. Six positive diodes 66 are also connected, at the outer ends, to positive cooling fin 163, which is connected to DC output terminal 73. Y-connected stator winding 23 can be substituted by a Δ-connected stator winding in a well-known manner.

Terminal member 161 has six partition members 171 which respectively surround six connecting portions 172, and three U-shaped partition members 174 which respectively surround three connecting portions 173. Partition members 171 and connecting portions 172 respectively correspond to partition members 71 and connecting portions 72 of the first embodiment. Each of partition members 171, 174 prevents water or electrolytes flowing along the surface of positive cooling fin 163 from reaching connecting portions 172, 173. It should be noted that a sufficient connection-work space is provided for six connecting portions which are surrounded by partition members 171, 174, as shown in FIG. 8.

Slits 175 are formed between semi-cylindrical partition member 171 and U-shaped partition member 174 to drain water or electrolytes.

Figure 10:
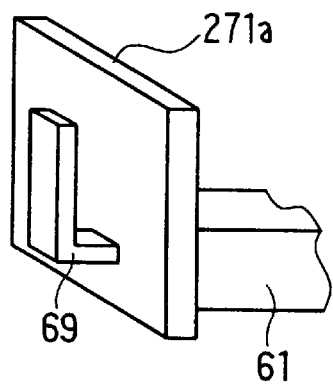
FIG. 10 is a fragmentary perspective view of a variation of a terminal member according to the first embodiment.
Figure 11:
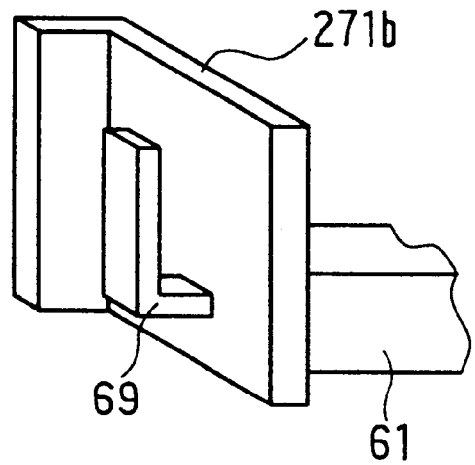
FIG. 11 is a fragmentary perspective view of another variation of a terminal member according to the first embodiment.
Figure 12:
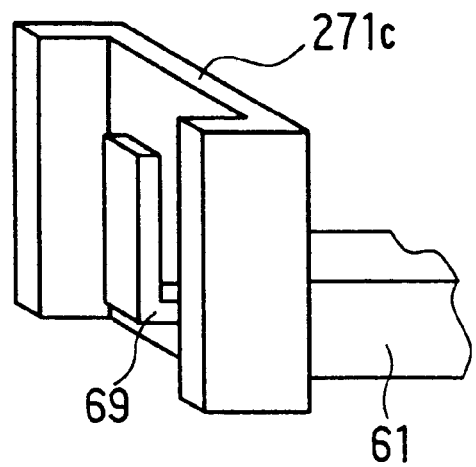
FIG. 12 is a fragmentary perspective view of another variation of a terminal member according to the first embodiment.

Semi-cylindrical partition member 71 or 171 can be substituted by flat partition member 271$a$, L-shaped partition member 271$b$ or U-shaped partition member 271$c$, as shown in FIG. 10, 11 or 12.

Preferably, the distance between partition member 71 and the outer periphery of positive cooling fin 63 is shorter than the distance between partition member 71 and connecting portion 72. However, the distance can be changed according to various conditions of an AC generator to be applied.

Second Embodiment

Figure 13:
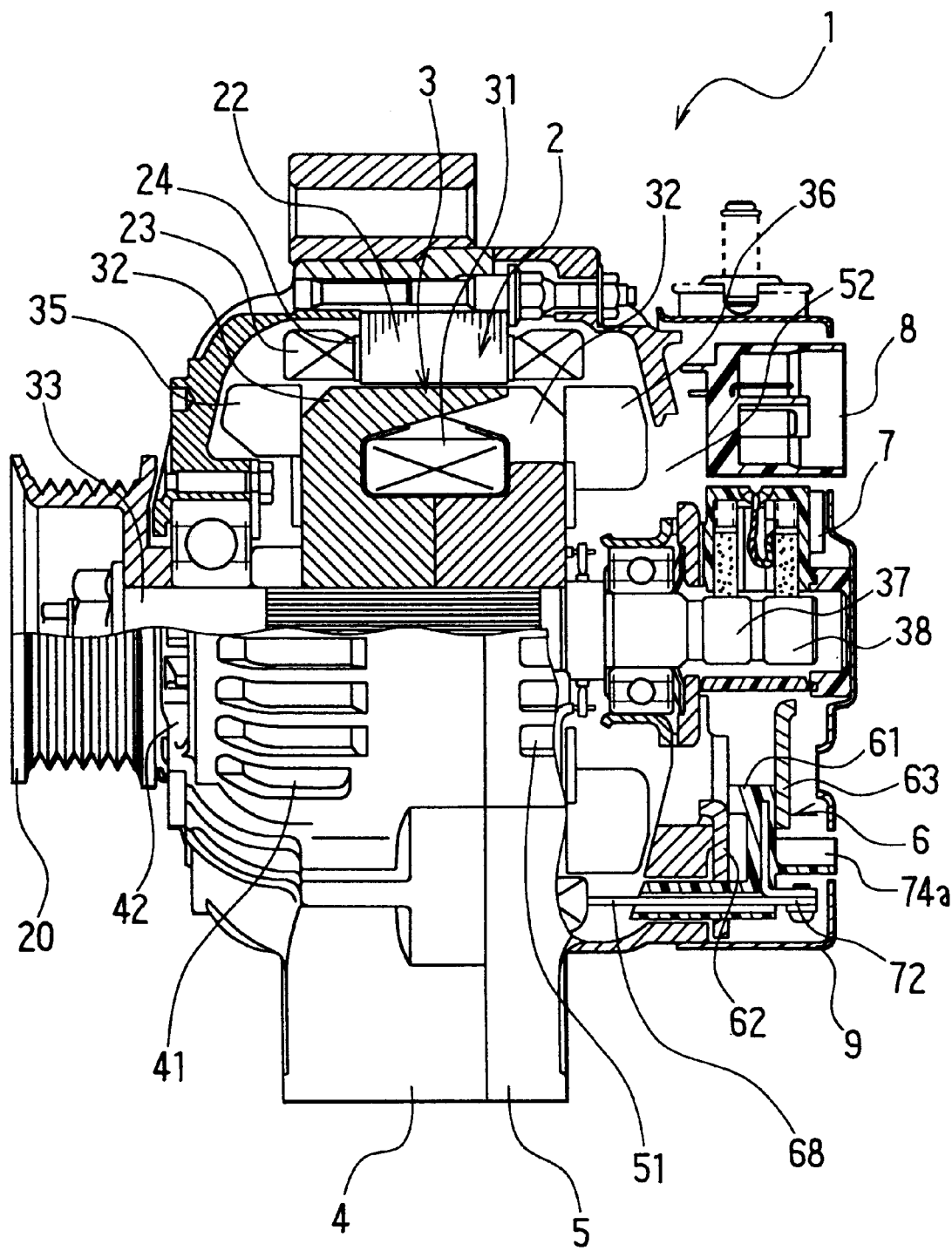
FIG. 13 is a cross-sectional side view of a vehicle AC generator according to a second embodiment of the invention.
Figure 14:
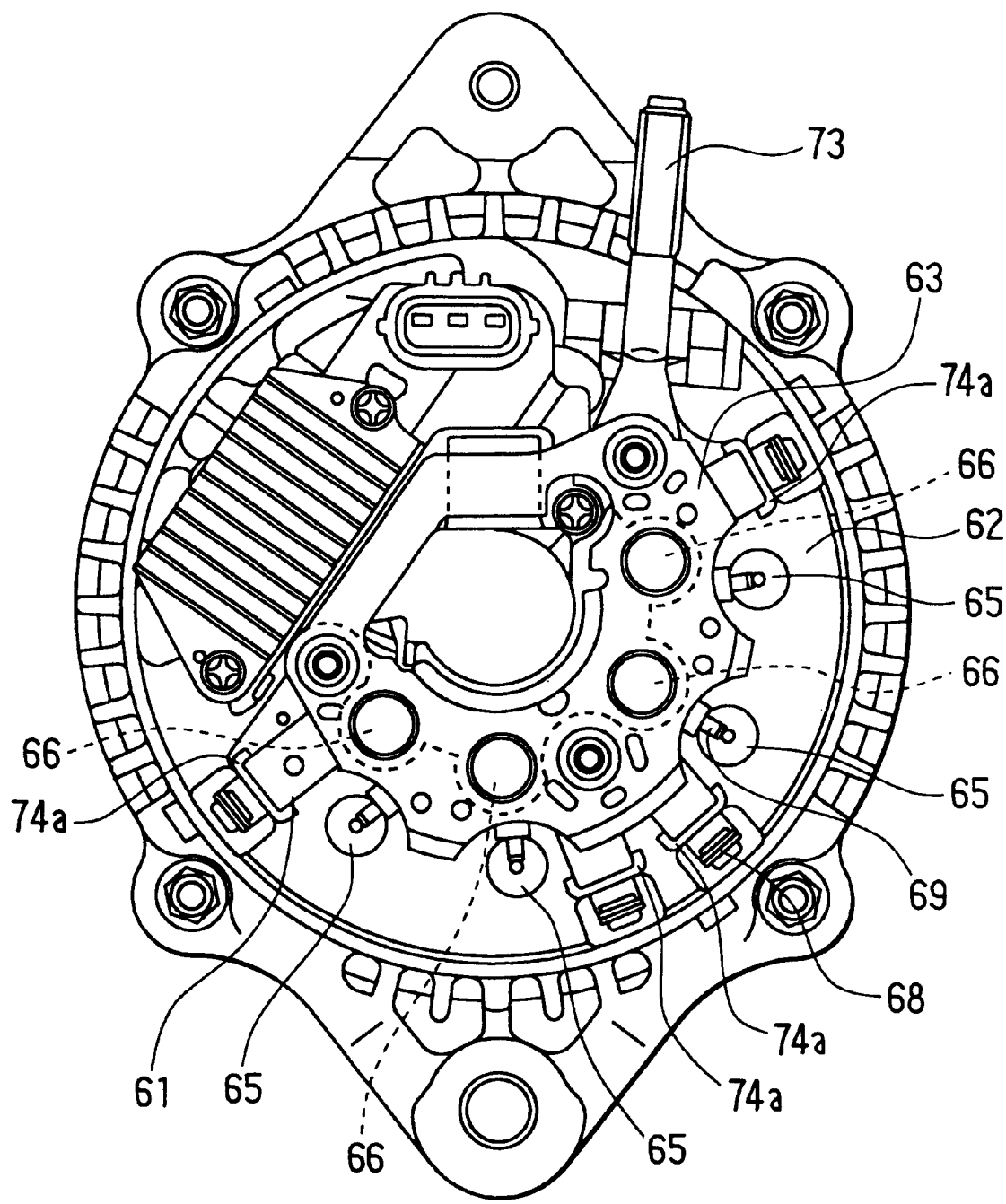
FIG. 14 is a rear view of the AC generator shown in FIG. 13.

As shown in FIGS. 13 and 14, a vehicle AC generator according to a second embodiment of the invention includes almost the same components as the first embodiment. The reference numerals that are the same as the first embodiment are substantially the same in structure and function.

Figure 15:
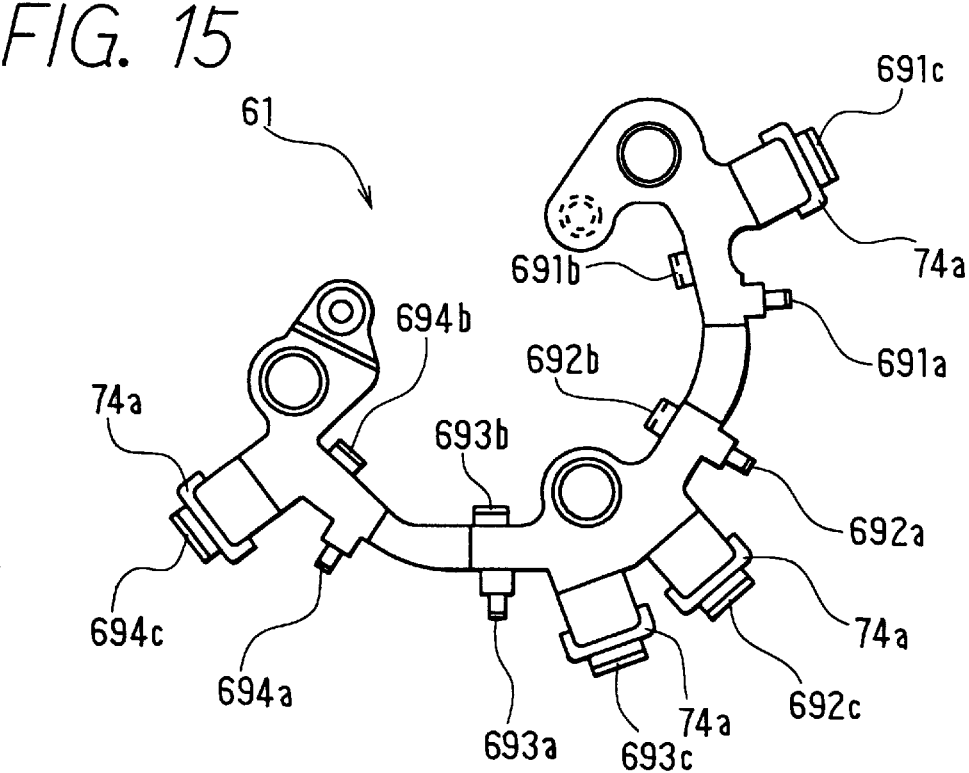
FIG. 15 is a schematic view of a terminal member of a rectifier according to the second embodiment.

Wiring terminals 69 are located as shown in FIG. 15, in which each wiring terminal is renumbered 691$a$, 691$b$, 691$c$–694$a$, 694$b$, 694$c$.

Outside wiring terminal 691$a$ is connected to negative diode 65 of the first pair, inside wiring terminal 691$b$ is connected to positive diode 66 of the same pair, and wiring terminals 691$a$, 691$b$ and input wiring terminal 691$c$ are connected to one another in terminal member 61. Outside wiring terminal 692$a$ is connected to negative diode 65 of the second pair, inside wiring terminal 692$b$ is connected to positive diode 66 of the same pair, and wiring terminals 692$a$, 692$b$ and 692$c$ are connected to one another in terminal member 61. Other wiring terminals are also connected in the same manner as above.

Figure 16:
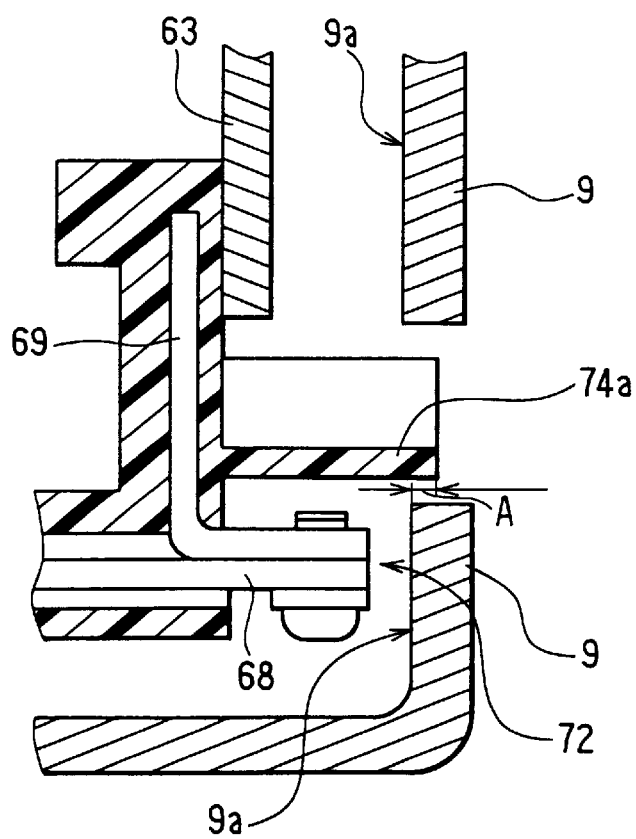
FIG. 16 is a schematic cross-sectional diagram illustrating a partition member according the second embodiment.

As shown in FIG. 16, four U-shaped or gutter-shaped partition members 74$a$ are formed in terminal member 61 to extend in the axial direction of rotor 3 toward rear cover 9. Four leads 68 extending from stator 23 are respectively connected to input wiring terminals 691$c$–694$c$ by screws, forming four connecting portions 72. Each of partition members 74$a$ extends in the axial direction of rotor 3 between one of connecting portions 72 and the outer periphery of positive cooling fin 63. Partition members 74$a$ are formed when terminal member 61 is insert-molded. It is also possible that partition members 74$a$ are formed separately and fixed to terminal member 61 thereafter.

Partition members 74$a$ extend beyond inner surface 9$a$ of cover 9 (i.e. A>0 in FIG. 16). Thus, partition members 74$a$ guide water or electrolytes flowing in along the outside surface of positive cooling fin 63 to the outside thereof, thereby preventing the same from entering connecting portions 72. U-shaped partition member 74$a$ can be replaced with semi-cylindrical or other concave member.

Figure 17:
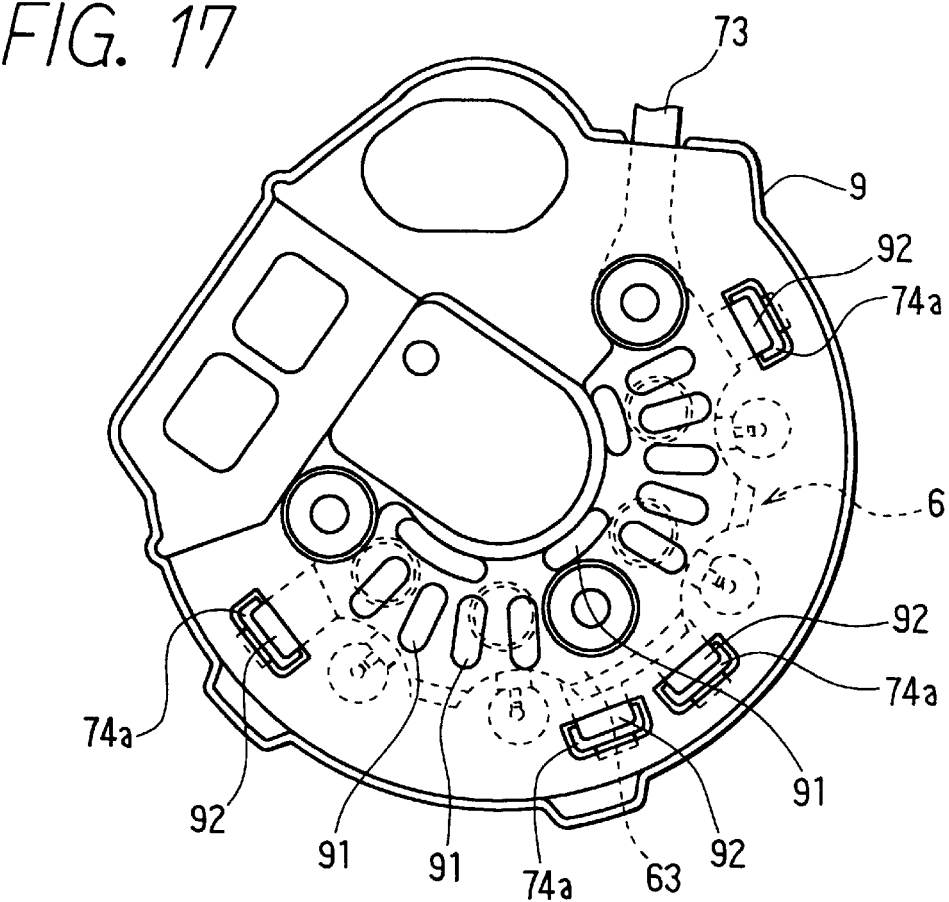
FIG. 17 is a plan view of a rear cover according to the second embodiment.

As shown in FIG. 17, rear cover 9 has a plurality of air intake windows 91 at portions corresponding to negative cooling fin 62 and four drain holes 92 at portions corresponding to partition members 74$a$, which are formed around intake windows 91. Accordingly, the guided water or electrolytes can be drained through drain holes 92.

Figure 18:
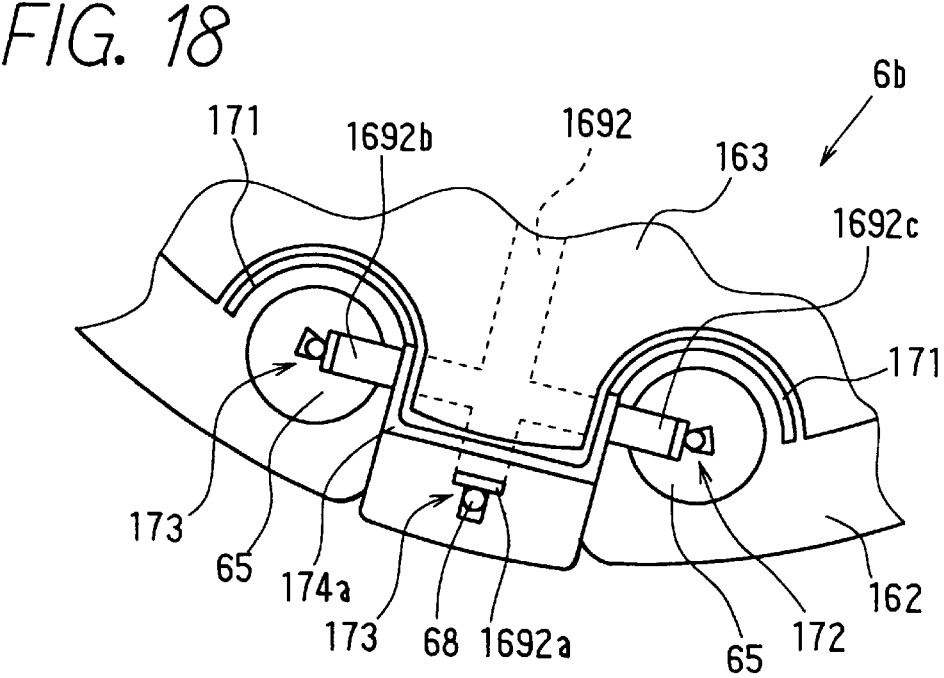
FIG. 18 is a fragmentary schematic view illustrating a variation of a rectifier unit according to the second embodiment.

A variation 6$b$ of rectifier unit 6 is shown in FIG. 18. Rectifier unit 6$b$ includes negative cooling fin 162 with six negative diodes 65 soldered thereto, positive cooling fin 163 with six positive diodes soldered thereto, and terminal member 161 connecting three groups of two pairs of positive diodes 65 and negative diodes 66. The structure of rectifier unit 6$b$ is almost the same as rectifier unit 6$a$ illustrated in FIG. 9 except the gutter-shape of partition member 174$a$.

Because two semi-cylindrical members 171 are connected by partition member 174, they provide not only a high rigidity but also an effective water draining passage.

The above described positive cooling fin can be disposed at front side of the negative cooling fin.

Figure 19:
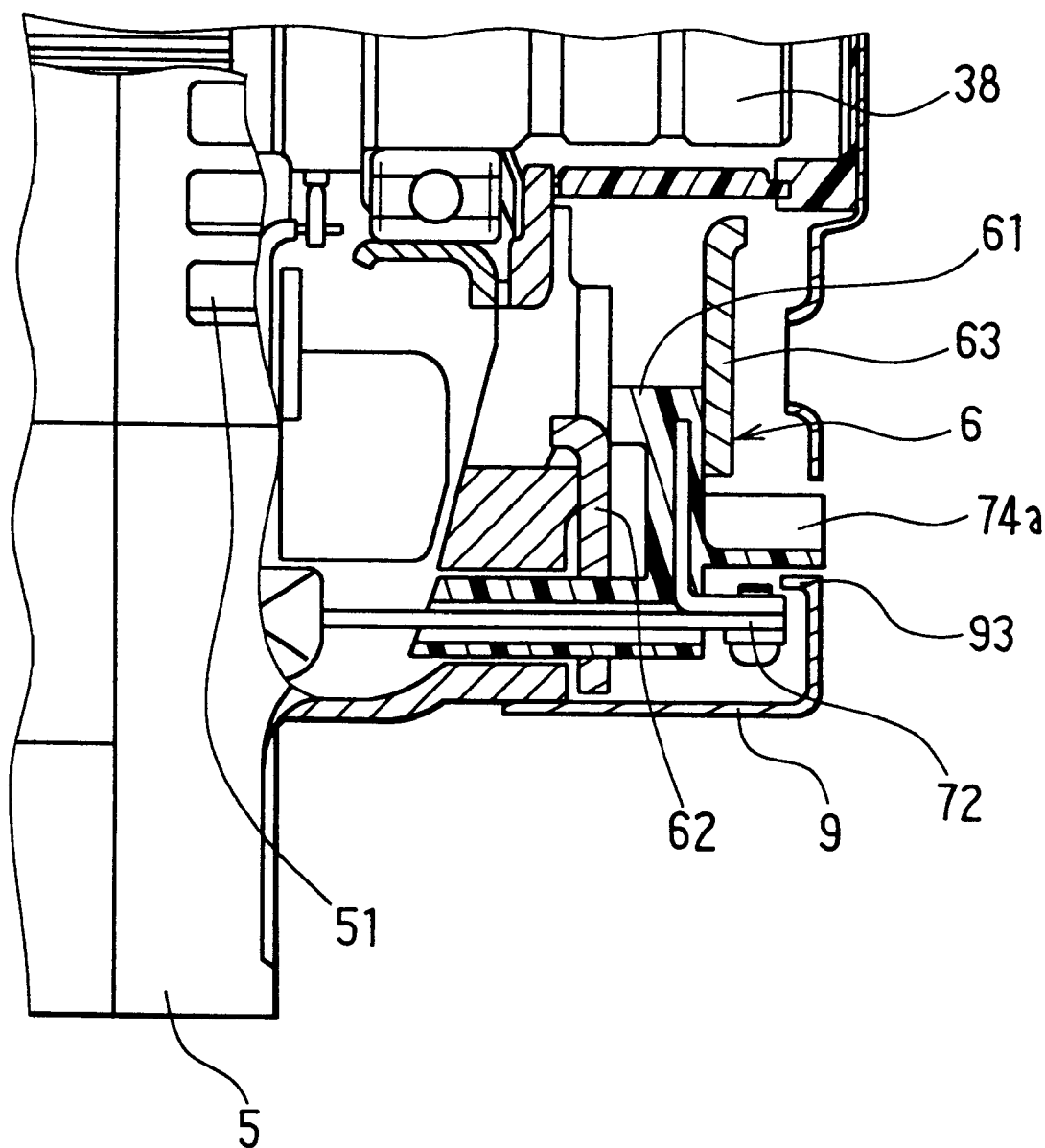
FIG. 19 is a fragmentary cross-sectional side view illustrating a variation of a drain passage of the rear cover according to the second embodiment.

Rear cover 9 can have guide member 93 extending axially inward to receive partition member 74$a$ as shown in FIG. 19.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An AC generator for a vehicle including a rotor having a shaft, a stator having a multi-phase stator winding, a multi-phase rectifier unit, a rectifier cover, and a frame for rotatably supporting said rotor, wherein said rectifier unit comprises a cooling fin structure, a plurality of diodes fixed to said cooling fin structure, and a terminal member having a wiring member connecting a plurality of output leads of said stator winding and said plurality of diodes at respective connecting portions, and said terminal member comprises a plurality of partition members each of which extends in parallel with said shaft between one of said connecting portions and said cooling fin structure.

2. The AC generator as claimed in claim 1, wherein each of said partition members extends toward said rectifier cover beyond said cooling fin.

3. The AC generator as claimed in claim 1, wherein each of said partition members extends beyond said plurality of connecting portions.

4. The AC generator as claimed in claim 1, wherein said rectifier unit is disposed outside said frame, said rectifier cover has a plurality of air intake windows disposed radially inner side of said partition members, and said connecting portions are disposed radially outer side of said partition members.

5. An AC generator for a vehicle including a rotor, a stator having a stator winding and a plurality of output leads, a rectifier unit, a insulation cover, and a frame for rotatably supporting said rotor, wherein said insulation cover has a plurality of drain holes and is disposed outside said frame to cover said rectifier unit, said rectifier unit comprises a cooling fin structure, a plurality of diodes fixed to said cooling fin structure, and a terminal member having a wiring member connected to said plurality of output leads at first connecting portions and connected to said plurality of diodes at second connecting portions, said terminal member has a plurality of first partition members each of which extends in parallel with the axis of said rotor between one of said first connecting portions and said cooling fin, and each of said first partition members is disposed at said drain holes.

6. The AC generator as claimed in claim 5, wherein each of said first partition members has a concave surface facing radially inward.

7. The AC generator as claimed in claim 5, further comprising a plurality of second partition members each of which is disposed between said cooling fin and one of said plurality of diodes to cover said second connecting portion.

8. An AC generator for a vehicle including a multi-phase stator windings, a rectifier unit and a rectifier cover, wherein said rectifier unit comprises a terminal member having a plurality of connecting portions and a plurality of partition members disposed radially inner side of said connecting portions, and said rectifier cover has a plurality of drain holes at portions corresponding to said partition members.

9. The AC generator as claimed in claim 8, each of said partition members extending outward from one of said drain holes.

10. The AC generator as claimed in claim 8, wherein each of said partition members has a concave surface facing radially inward.

11. The AC generator as claimed in claim 8, wherein said rectifier unit has a plurality of connecting portions connected to said multi-phase stator winding, and each of said plurality of partition members covers one of said connecting portions.

12. The AC generator as claimed in claim 8, wherein said rectifier unit comprises a terminal member having wiring terminals connecting said diodes and said partition members molded with resinous insulation material.

13. The AC generator as claimed in claim 8, wherein said rectifier unit has a first cooling fin disposed radially inside said plurality of partition members.

14. The AC generator as claimed in claim 8, wherein said rectifier unit comprises a first cooling fin disposed near said rectifier cover, a second cooling fin and a terminal member disposed between said first and second cooling fins, and said partition members extend from said terminal member toward said rectifier cover beyond said first cooling fin.

15. An AC generator for a vehicle including a rotor, a stator having a three-phase stator winding with three output leads, a three-phase full-wave rectifier unit, an insulation cover, and a frame for rotatably supporting said rotor, said rectifier unit comprising:

a cooling fin structure having at least three positive diodes and three negative diodes fixed thereto; and a terminal member having a wiring member connecting said positive and negative diodes to form said three-phase full-wave rectifier unit and at least three first partition members, said wiring member having first connecting portions connected to said positive and negative diodes and second connecting portions connected to said three output leads, each of said first partition members extending toward said insulation cover between one of said first connecting portions and said cooling fin structure.

16. The AC generator as claimed in claim 15, wherein said terminal member further having at least three second partition members extending toward said insulation cover between one of said second connecting portions and said cooling fin structure.

17. The AC generator as claimed in claim 16, wherein said insulation cover has a plurality of drain holes, and each of said second partition members is disposed at one of said drain holes.

18. An AC generator for a vehicle including a rotor, a stator having a three-phase stator winding with three output leads, a three-phase full-wave rectifier unit, an insulation cover, and a frame for rotatably supporting said rotor, said rectifier unit comprising:

a cooling fin structure having at least three positive diodes and three negative diodes fixed thereto; and a terminal member having a wiring member connecting said positive and negative diodes to form said three-phase full-wave rectifier unit and a partition structure, said wiring member having connecting portions connected to said positive and negative diodes and to said three output leads, said partition structure extending toward said insulation cover between said connecting portions and said cooling fin structure.

* * * * *